United States Patent
Samudra

(10) Patent No.: US 8,279,866 B2
(45) Date of Patent: Oct. 2, 2012

(54) METHOD AND SYSTEM FOR SWITCHING PACKETS IN A COMMUNICATION NETWORK

(75) Inventor: Pradeep Samudra, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 914 days.

(21) Appl. No.: 11/182,207

(22) Filed: Jul. 15, 2005

(65) Prior Publication Data

US 2006/0104271 A1   May 18, 2006

Related U.S. Application Data

(60) Provisional application No. 60/628,590, filed on Nov. 17, 2004.

(51) Int. Cl.
*H04L 12/56* (2006.01)

(52) U.S. Cl. ............... 370/390; 370/394; 370/395.1; 370/474; 370/535

(58) Field of Classification Search ............... None
See application file for complete search history.

(56) References Cited

U.S. PATENT DOCUMENTS

| | | | | |
|---|---|---|---|---|
| 5,550,978 | A * | 8/1996 | Takahashi et al. | 709/236 |
| 6,134,246 | A * | 10/2000 | Cai et al. | 370/474 |
| 6,574,191 | B1 * | 6/2003 | Usukura et al. | 370/216 |
| 6,788,686 | B1 * | 9/2004 | Khotimsky et al. | 370/394 |
| 6,876,660 | B1 * | 4/2005 | Hughes et al. | 370/395.4 |
| 7,123,581 | B2 * | 10/2006 | Sharma et al. | 370/218 |
| 7,227,861 | B2 * | 6/2007 | Tomonaga et al. | 370/386 |
| 2004/0062228 | A1 * | 4/2004 | Wu | 370/351 |
| 2006/0239259 | A1 * | 10/2006 | Norman et al. | 370/386 |

* cited by examiner

*Primary Examiner* — Nishant B Divecha
*Assistant Examiner* — Tito Pham

(57) ABSTRACT

A method for switching packets in a communication network is provided. The method includes dividing a data stream into at least two sub-streams in a first application card received in a first application card slot of a packet switch. A first sub-stream is sent through a first application port associated with the first application card slot to a first switch port associated with a switch port slot of the packet switch. The switch port slot is operable to receive a switch card for the packet switch. A second sub-stream is sent through a second application port associated with the first application card slot to a second switch port associated with the switch port slot.

20 Claims, 4 Drawing Sheets

METHOD AND SYSTEM FOR SWITCHING PACKETS IN A COMMUNICATION NETWORK

CROSS-REFERENCE TO RELATED APPLICATION AND CLAIM OF PRIORITY

The present invention is related to that disclosed in U.S. Provisional Patent No. 60/628,590, filed Nov. 17, 2004, entitled "Inexpensive Method to Double the Performance of High Speed Packet Switches." U.S. Provisional Patent No. 60/628,590 is assigned to the assignee of the present application. The subject matter disclosed in U.S. Provisional Patent No. 60/628,590 is hereby incorporated by reference into the present disclosure as if fully set forth herein. The present application hereby claims priority under 35 U.S.C. §119(e) to U.S. Provisional Patent No. 60/628,590.

TECHNICAL FIELD OF THE INVENTION

The present invention relates generally to wireless networks and, more specifically, to a method and system for switching packets in a communication network.

BACKGROUND OF THE INVENTION

The Asynchronous Transfer Mode (ATM) standard allows interoperability of information between associated systems in a communication network. Using ATM, variable-length packets are segmented into fixed-length cells and sent to a destination, where the cells are reassembled into packets. Because they are a fixed length, the cells may be sent in a predictable manner through the network, and the associated switches and transportation systems are able to achieve high-speed and flexible communications.

If an ATM switch receives a stream of ATM cells over a high-bandwidth communication link, such as an OC-3, and those cells are to be sent to another ATM switch with which the first ATM switch may only communicate using multiple lower bandwidth communication links, such as T-1 lines, a process called inverse multiplexing is sometimes used to send the cells to the second ATM switch more quickly than would otherwise be possible. This inverse multiplexing process involves the first ATM switch sending cells for some packets on one communication link and cells for other packets on other communication links. The second ATM switch then resynchronizes the packets after receiving the cells over the different communication links. One example of this inverse multiplexing process is described in U.S. Pat. No. 6,134,246 issued to Cai, et al., which is hereby incorporated by reference.

Conventional ATM switches, as well as other types of packet switches, are thus able to provide data to other packet switches at a higher rate than a single communication link connecting them would otherwise allow. However, each of these packet switches has a rated capacity that limits the speed with which the packet switch is able to switch an incoming stream of packets or cells before they are sent to another packet switch. In order to increase the capacity of one of these switches, typically the backplane is redesigned, and application and switch cards within the switch are replaced with cards that have an increased capacity for switching. However, this approach to increasing switch capacity is not always possible and, when it is possible, may be relatively expensive.

Therefore, there is a need in the art for an improved packet switch that is capable of switching packets at higher data rates without prohibitive costs. In particular, there is a need for a packet switch that is able to switch packets at a higher data rate than the packet switch's rated capacity without redesigning the backplane or replacing existing cards with higher-capacity cards.

SUMMARY OF THE INVENTION

In accordance with the present invention, a method and system for switching packets in a communication network are provided that substantially eliminate or reduce disadvantages and problems associated with conventional methods and systems.

To address the above-discussed deficiencies of the prior art, it is a primary object of the present invention to provide a method for switching packets in a communication network. According to an advantageous embodiment of the present invention, the method comprises dividing a data stream into at least two sub-streams in a first application card received in a first application card slot of a packet switch. A first sub-stream is sent through a first application port associated with the first application card slot to a first switch port associated with a switch port slot of the packet switch. The switch port slot is operable to receive a switch card for the packet switch. A second sub-stream is sent through a second application port associated with the first application card slot to a second switch port associated with the switch port slot.

According to one embodiment of the present invention, the method also includes replicating the first sub-stream at the first switch port and sending the replicated first sub-stream to a third switch port for backup. The third switch port is associated with a backup switch port slot that is operable to receive a backup switch card for the packet switch. The second sub-stream is replicated at the second switch port and the replicated second sub-stream is sent to a fourth switch port for backup. The fourth switch port is also associated with the backup switch port slot.

According to another embodiment of the present invention, the method also includes switching the first sub-stream from the first switch port to a third switch port and sending the first sub-stream through the third switch port to a third application port associated with a second application card that is received in a second application card slot of the packet switch. The second sub-stream is switched from the second switch port to a fourth switch port and the second sub-stream is sent through the fourth switch port to a fourth application port associated with the second application card. The data stream is regenerated at the second application card based on the first and second sub-streams and the regenerated data stream is sent out from the second application card.

According to still another embodiment of the present invention, the data stream is divided into at least two sub-streams by adding a sequence number to each packet, and the data stream is regenerated by ordering the packets based on the sequence numbers.

According to yet another embodiment of the present invention, the data stream includes a plurality of sets of fixed-length cells, with each set of cells operable to be assembled into a variable-length packet. Each sub-stream includes a plurality of the sets of cells. The data stream is divided into at least two sub-streams by adding a sequence number to each set of cells, and the data stream is regenerated by ordering the sets of cells based on the sequence numbers.

According to a further embodiment of the present invention, each set of cells is assembled into a packet, the sequence number is added to each set of cells by adding the sequence number to the packet, and each packet with the sequence number added is disassembled into a set of cells. The data stream is then regenerated by assembling each set of cells into a packet, ordering the packets based on the sequence numbers, removing the sequence number from each packet, and disassembling each packet with the sequence number removed into a set of cells.

According to a still further embodiment of the present invention, the method also includes selecting in which of the sub-streams a particular set of cells is to be included based on a traffic load for the first application port and a traffic load for the second application port while the particular set of cells is being assembled into a packet, having a sequence number added, and being disassembled into a set of cells.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch.

Figure 1:
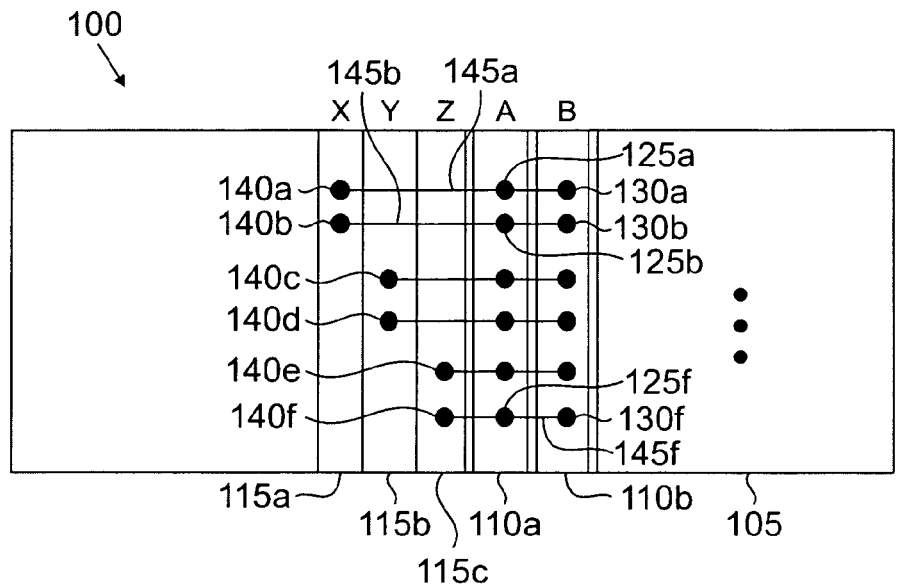
FIG. 1 illustrates a packet switch capable of switching packets for a communication network according to the principles of the present invention.

FIG. 1 illustrates a packet switch 100 capable of switching packets for a communication network according to the principles of the present invention. Packet switch 100 comprises a multi-slot chassis-based system having a common backplane 105 spanning a plurality of switch card slots 110*a-b* and a plurality of application card slots 115*a-c*. For the illustrated embodiment, backplane 105 comprises two switch card slots 110, which are operable to receive switch cards A and B, and three application card slots 115, which are operable to receive application cards X, Y and Z. However, it will be understood that backplane 105 may comprise any suitable number of slots 110 and 115 without departing from the scope of the present invention.

Switch card slot 110*a* comprises a plurality of switch ports 125*a-f* and switch card slot 110*b* comprises a plurality of switch ports 130*a-f*. For a particular embodiment, each switch card slot 110 comprises a number of switch ports 125 or 130 that is equal to twice the number of application card slots 115. However, it will be understood that other embodiments may be implemented in which the number of switch ports 125 or 130 is another suitable number without departing from the scope of the present invention. Each application card slot 115 comprises at least two application ports 140, with each application port 140 having at least two corresponding switch ports 125 and 130.

Each application card slot 115 is operable to send data for the corresponding application card through its two application ports 140 to two switch ports 125 and/or 130. For one particular example, application card slot 115*a* may be operable to send data through application ports 140*a* and 140*b* from application card X to switch ports 125*a* and 125*b* for switch card A. As described below, a plurality of connection replicators 145*a-f* provides options that allow application card slot 115*a* to instead be operable to send data through application ports 140*a* and 140*b* from application card X to switch ports 130*a* and 130*b* for switch card B, to switch port 125*a* for switch card A and switch port 130*b* for switch card B, or to switch port 125*b* for switch card A and switch port 130*a* for switch card B.

Each switch port 125 for switch card slot 110*a* is coupled to a switch port 130 for switch card slot 110*b* by one of the connection replicators 145. Each connection replicator 145 is operable to ensure that data on both of its corresponding ports 125 and 130 are the same in both directions. Thus, continuing with the same example as above, connection replicator 145*a* ensures that data on switch port 125*a* and switch port 130*a* are the same and connection replicator 145*b* ensures that data on switch port 125*b* and switch port 130*b* are the same. So the data sent to switch ports 125*a* and 125*b* by application card X is also sent to switch ports 130*a* and 130*b* by way of connection replicators 145*a* and 145*b*, respectively.

Thus, the data may be sent to either switch port 125*a* or 130*a* and to either switch port 125*b* or 130*b*, and connection replicators 145*a-b* cause that data to be received at each of the four switch ports 125*a-b* and 130*a-b*. Similarly, data may be sent from either switch port 125*a* or 130*a* and from either switch port 125*b* or 130*b*, and connection replicators 145*a-b* cause that data to be sent from each of the four switch ports 125*a-b* and 130*a-b*.

As described in more detail below, each application card is operable to send data at up to twice the rated capacity for packet switch 100 by sending a first portion of the data to one switch port 125 or 130 and a second portion of the data to another switch port 125 or 130. Continuing with the above example, application card X is operable to send a first portion of data to switch card A by sending the data from application port 140*a* to switch port 125*a* and to send a second portion of data to switch card A by sending the data from application port 140*b* to switch port 125*b*. The data is also provided to switch card B through switch ports 130*a* and 130*b* by connection replicators 145*a* and 145*b* for backup in case switch-card A fails.

Switch card A is then operable to identify an outgoing port 125 for each incoming port 125*a* and 125*b* on which data was received. For example, switch card A may identify switch port 125*c* as the outgoing port for the data received at switch port 125*a* and switch port 125*d* as the outgoing port for the data received at switch port 125*b*. After switch card slot 110*a* sends the data received at switch port 125*a* to switch port 125*c* and the data received at switch port 125*b* to switch port 125*d*, the data is sent from switch port 125*c* to application port 140*c* and from switch port 125*d* to application port 140*d* for application card slot 115*b*, or application card Y. The data is also replicated for switch card B by connection replicators 145 *a-d*. In this way, packet switch 100 is operable to switch data at up to twice its rated capacity as application cards may send and receive data at twice the rate by using two application ports 140 for communicating with each switch card.

Figure 2:
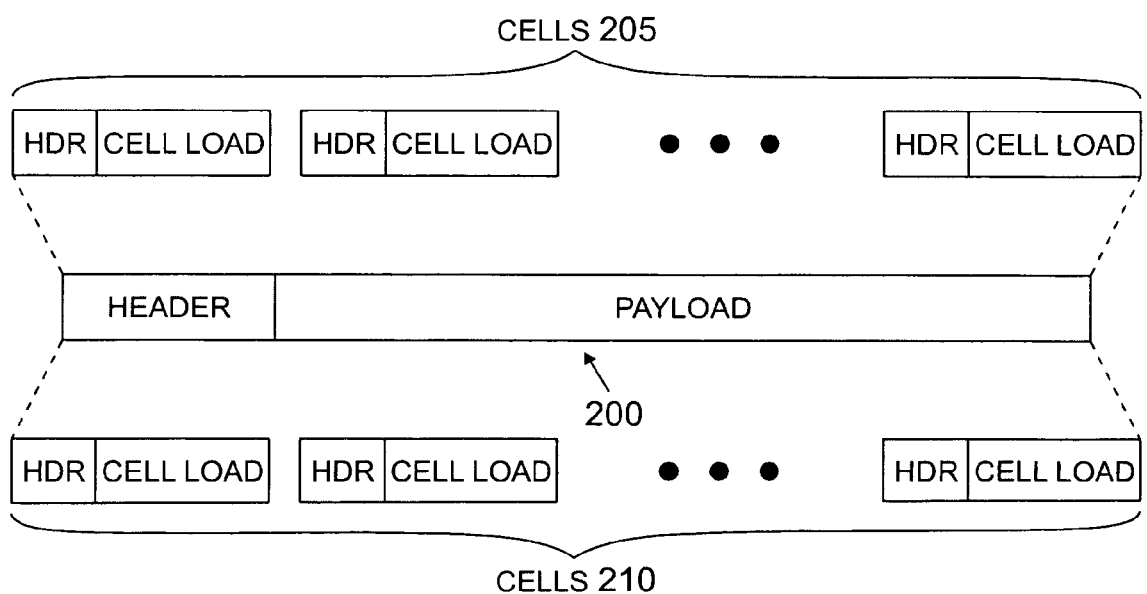
FIG. 2 illustrates a packet that may be assembled and disassembled for processing according to the principles of the present invention.

FIG. 2 illustrates a packet 200 that may be assembled and disassembled for processing according to a particular embodiment of the present invention. Packet 200 may comprise a header and a payload and may be any suitable length. Packet 200 may be disassembled into a plurality of cells 205 or 210 that comprise a fixed or variable length. For example, for ATM cells, the cells 205 and 210 comprise a fixed length of 53 bytes, with 5 bytes for a header and 48 bytes for other data. For another particular embodiment, each packet processed by packet switch 100 may comprise a non-ATM packet of a fixed or variable length that is not disassembled and/or reassembled during processing but is instead processed intact.

For the present invention, as described in more detail below in connection with FIG. 3B, packet 200 is operable to be assembled from a plurality of cells 205 received at an application card in an application card slot 115 of packet switch 100. A sequence number for packet 200 is then added to packet 200. For example, the sequence number for packet 200 may be added in available space within the header of packet 200 or may be added to the payload of packet 200. The sequence number is operable to identify where the packet 200 belongs in relation to other packets 200 in a data stream so that the packets 200 may be synchronized if received out of order. With the sequence number added, packet 200 is then disassembled into a plurality of cells 210 again.

Cells 210 are sent to another application card through application ports 140 and switch ports 125 or 130, where the cells 210 are reassembled to form packet 200. Packet 200 is synchronized with other packets 200 received at the same application card in the same data stream based on the sequence numbers for each of the received packets 200. The sequence number is then removed and packet 200 is disassembled into the original cells 205 for transmission from the application card to another destination.

Figure 3A:
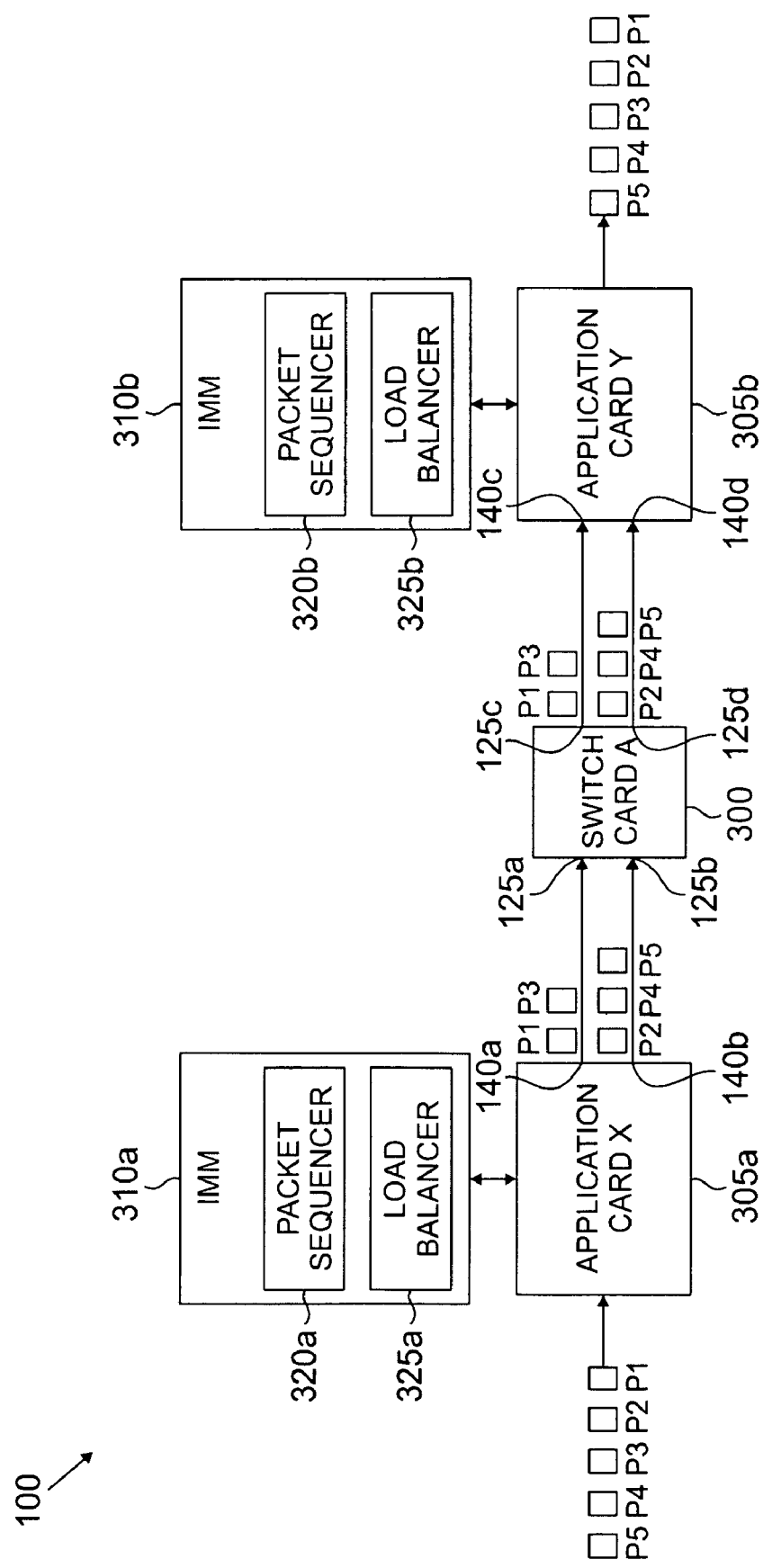
FIGS. 3A and 3B illustrate details of a portion of the packet switch of FIG. 1 according to the principles of the present invention.
Figure 3B:
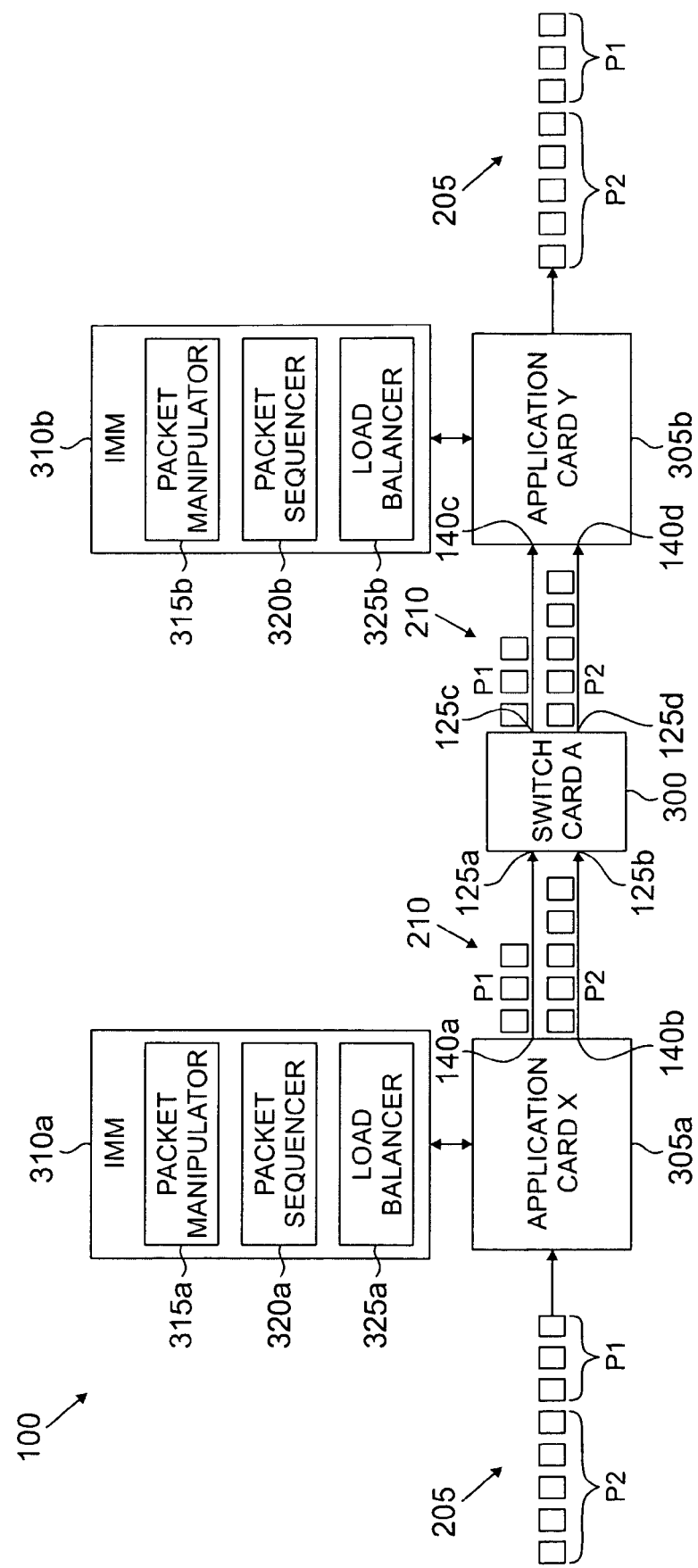

FIGS. 3A and 3B illustrate details of a portion of packet switch 100 according to the principles of the present invention. The illustrated embodiment of a portion of packet switch 100 comprises a switch card 300, an incoming application card 305*a*, and outgoing application card 305*b*, and an inverse-multiplexing module (IMM) 310*a-b* associated with each application card 305*a-b*.

FIG. 3A illustrates an embodiment in which packets are not assembled from and disassembled into cells but are processed as intact packets. Thus, the packets of FIG. 3A comprise non-ATM packets. FIG. 3B illustrates an embodiment in which packets 200 are assembled from and disassembled into cells 205 and 210. Thus, the packets 200 of FIG. 3B may comprise ATM packets or other types of packets that are processed as cells.

Referring to FIG. 3A, the sequence of packets P1-P5 may not be synchronized when received at application card 305*b*. Because of inverse multiplexing being performed on the data stream of packets, the packets are sent over different connections and may arrive out of order.

As previously described, application card 305*a* is operable to send data to switch card 300 through two application ports 140*a* and 140*b*. In order to do this, application card 305*a* is operable to provide inverse multiplexing for the incoming data stream, which comprises packets P1-P5, for example. In addition, application card 305*b* is operable to provide inverse multiplexing to generate an outgoing data stream, which comprises the same packets P1-P5 that make up the incoming data stream. Although the illustrated embodiment shows application card 305*a* receiving an incoming data stream and application card 305*b* transmitting an outgoing data stream, it will be understood that each application card 305*a-b* may receive an incoming data stream and may transmit an outgoing data stream.

The inverse multiplexing for each application card 305*a* and 305*b* is performed by its associated IMM 310*a* and 310*b*. Each IMM 310 comprises a packet sequencer 320 and a load balancer 325. It will be understood that any of the features described with respect to these components 320 and 325 may be combined in any suitable manner and that the division of these features into the two separate components 320 and 325 as described below is only one possible embodiment of IMM 310.

Packet sequencer 320*a* is operable to add a sequence number to each of the packets P1-P5. Packet sequencer 320*b* is operable to synchronize the packets P1-P5 based on the sequence numbers and is operable to remove the sequence numbers from the packets P1-P5.

Load balancer 325*a* is operable to balance the loads for each application port 140*a* and 140*b* for application card 305*a*. Thus, for example, if one relatively long packet is being sent through application port 140*a*, load balancer 325*a* is operable to send two or more shorter packets through application port 140*b* before sending another packet through application port 140*a*. Load balancer 325*a* is operable to select for transmission of a packet the application port 140 with the lowest traffic load by using any suitable load-balancing algorithm. Application card 305*a* is operable to send each packet through the application port 140*a* or 140*b* selected by load balancer 325*a*.

Referring to FIG. 3B, the sequence of cells 205 or 210 sent over a single connection is not altered, so each cell 205 or 210 does not carry any sequence information and cells 205 or 210 do not have to be synchronized when received. However, when cells 210 for a particular packet 200 may be sent over a different connection from cells 210 for other packets 200, the packets 200 may arrive in an unsynchronized state. For example, when inverse multiplexing is performed on a data stream, packets 200 are sent over different connections and may arrive out of order.

Application card 305*a* is operable to send data to switch card 300 through two application ports 140*a* and 140*b*. In order to do this, application card 305*a* is operable to provide inverse multiplexing for the incoming data stream, which comprises cells 205 that make up packets P1 and P2, for example. In addition, application card 305*b* is operable to provide inverse multiplexing to generate an outgoing data stream, which comprises the same cells 205 that make up the same packets P1 and P2 as those in the incoming data stream. Although the illustrated embodiment shows application card 305a receiving an incoming data stream and application card 305b transmitting an outgoing data stream, it will be understood that each application card 305a-b may receive an incoming data stream and may transmit an outgoing data stream.

The inverse multiplexing for each application card 305a and 305b is performed by its associated IMM 310a and 310b. Each IMM 310 comprises a packet manipulator 315, a packet sequencer 320, and a load balancer 325. It will be understood that any of the features described with respect to any of these components 315, 320 and/or 325 may be combined in any suitable manner and that the division of these features into the three components 315, 320 and 325 as described below is only one possible embodiment of IMM 310.

Packet manipulator 315 is operable to assemble and disassemble packets 200 received at application card 305. For the illustrated embodiment in which cells 205 are received at application card 305a and transmitted from application card 305b, packet manipulator 315a is operable to assemble cells 205 into packets P1 and P2 and to disassemble the packets after sequence numbers have been added to them into cells 210. Similarly, packet manipulator 315b is operable to assemble cells 210 into packets P1 and P2 and to disassemble the packets after sequence numbers have been removed from them into cells 205.

Packet sequencer 320a is operable to add a sequence number to the packets P1 and P2 after packet manipulator 315a has assembled cells 205 into packets P1 and P2. Packet sequencer 320b is operable to synchronize packets P1 and P2 based on the sequence numbers after packet manipulator 315b has assembled cells 210 into packets P1 and P2 and is operable to remove the sequence numbers from the packets P1 and P2 before packet manipulator 315b disassembles the packets P1 and P2 into cells 205.

Load balancer 325a is operable to balance the loads for each application port 140a and 140b for application card 305a. Thus, for example, if one relatively long packet is being sent through application port 140a, load balancer 325a is operable to send two or more shorter packets through application port 140b before sending another packet through application port 140a. Load balancer 325a is operable to select for transmission of a packet 200 the application port 140 with the lowest traffic load by using any suitable load-balancing algorithm. Application card 305a is operable to send each of the cells 210 that make up a particular packet 200 through the application port 140a or 140b selected by load balancer 325a. This ensures that the cells 210 for that particular packet 200 arrive at application card 305b in the correct order.

Figure 4:
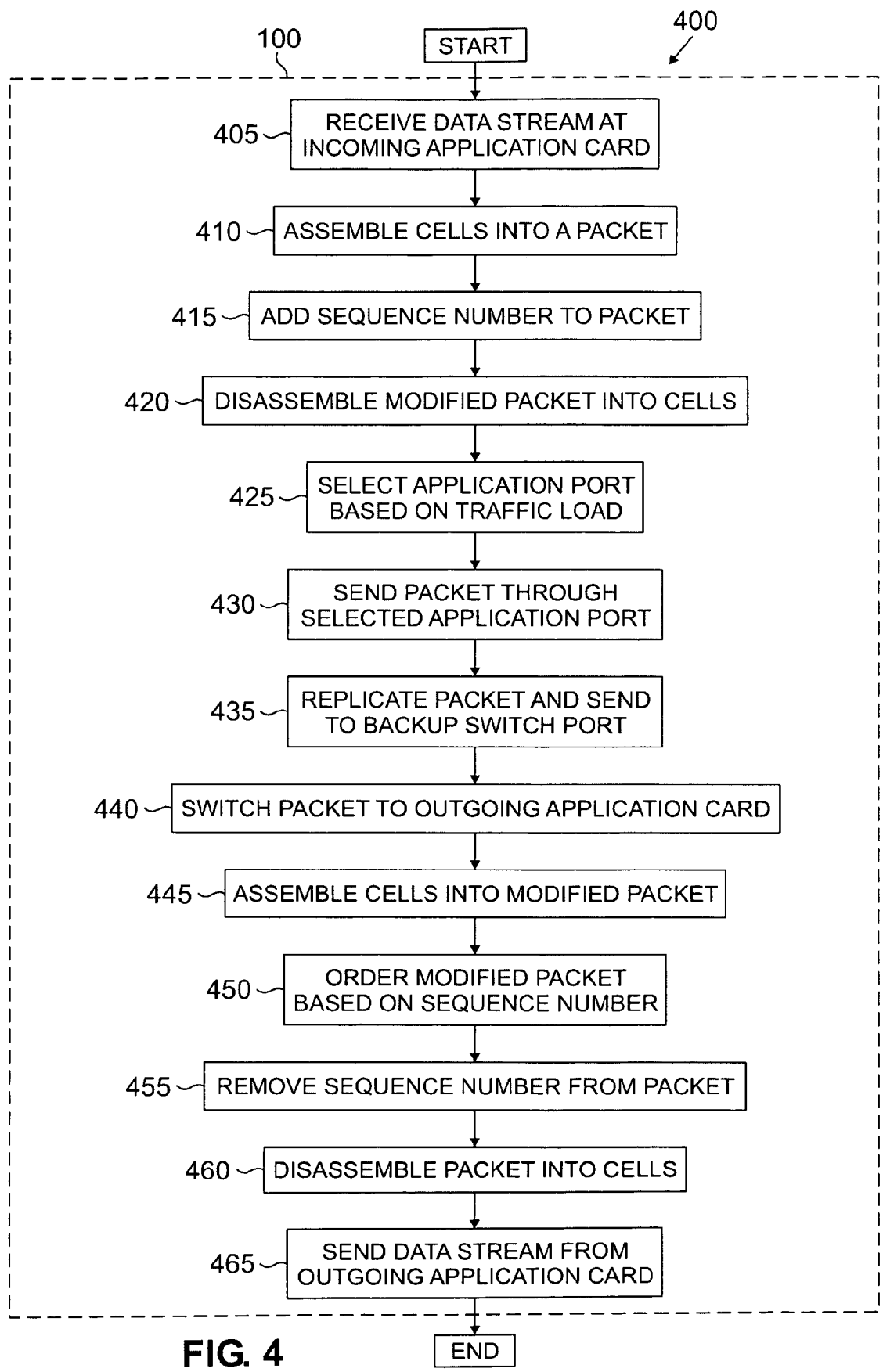
FIG. 4 is a flow diagram illustrating a method for switching packets with the packet switch of FIG. 1 according to the principles of the present invention.

FIG. 4 is a flow diagram illustrating a method 400 for switching packets 200 with packet switch 100 according to the principles of the present invention. The following description is based on the embodiment illustrated in FIGS. 3A and 3B; therefore, it will be understood that references to switch card 300 apply to any switch card in any switch card slot 110 of packet switch 100 and references to application cards 305 apply to any application card in any application card slot 115 of packet switch 100. In addition, the following description is directed to switching a single packet 200 in packet switch 100. However, it will be understood that the method is repeated for each packet 200 received at packet switch 100.

Initially, an incoming application card 305a receives a data stream comprising a plurality of packets (or cells 205) at an input port for the application card 305a (process step 405). Application card 305a provides the packets (or cells 205) to IMM 310a, where packet manipulator 315a may assemble some of the cells 205 into a packet 200 for the embodiment in which the data stream comprises cells 205 (process step 410). Packet sequencer 320a then adds a sequence number to the packet (process step 415), and packet manipulator 315a may disassemble the modified packet 200 with the sequence number added into a plurality of cells 210 for the embodiment in which the data stream comprises cells 205 (process step 420).

Load balancer 325a selects an application port 140a or 140b for the packet (or cells 210) based on the traffic load associated with each application port 140a and 140b (process step 425). It will be understood that, for the embodiment in which the data stream comprises cells 205, load balancer 325a may make this selection while the packet 200 is being assembled, having a sequence number added and/or being disassembled.

Application card 305a then sends the packet (or cells 210) received from IMM 310a through the application port 140a or 140b selected by load balancer 325a to an input switch port 125a or 125b for switch card 300 (process step 430). The packet (or cells 210) is also replicated by connection replicator 445a or 445b and sent to a backup switch port 130a or 130b (process step 435).

At switch card 300, the packet (or cells 210) are switched to the appropriate output switch port 125c or 125d and sent to an outgoing application card 305b through application port 140c or 140d (process step 440). Application card 305b provides the packet (or cells 210) to IMM 310b, where packet manipulator 315b may assemble the cells 210 into the modified packet 200 for the embodiment in which the data stream comprises cells 205 (process step 445).

Packet sequencer 320b then orders the modified packet in relation to other packets received from switch card 300 based on the sequence number added to the packet (process step 450), after which packet sequencer 320b removes the sequence number from the packet (process step 455).

For the embodiment in which the data stream comprises cells 205, packet manipulator 315b may then disassemble the packet 200 without the sequence number into a plurality of cells 205, which comprise the same cells 205 originally received at the incoming application card 305a (process step 460). Finally, the outgoing application card 305b sends the packet (or cells 205) through an output port for the outgoing application card 305b to another destination (process step 465).

Although the present invention has been described with an exemplary embodiment, various changes and modifications may be suggested to one skilled in the art. It is intended that the present invention encompass such changes and modifications as fall within the scope of the appended claims.

What is claimed is:

1. A method for switching packets in a communication network, comprising:
   dividing a data stream into at least two sub-streams in a first application card received in a first application card slot of a packet switch using a packet manipulator configured to split the data stream into the at least two sub-streams, wherein the data stream is comprised of a plurality of cells that are placed into a plurality of packets by the packet manipulator;
   balancing a load created by the data stream between the at least two sub-streams;
   sending a first sub-stream through a first application port associated with the first application card slot to a first switch port associated with a primary switch card slot of the packet switch, the primary switch card slot configured to receive a primary switch card for the packet switch;

sending a second sub-stream through a second application port associated with the first application card slot to a second switch port associated with the primary switch card slot;

replicating the first sub-stream at the first switch port and sending the replicated first sub-stream to a first replicated switch port associated with a backup switch card slot through a first connection replicator coupled to the first switch port and the first replicated switch port, the backup switch card slot configured to receive a backup switch card for the packet switch, wherein the first connection replicator is configured to ensure that data on the first switch port and the first replicated switch port are the same in both directions; and replicating the second sub-stream at the second switch port and sending the replicated second sub-stream to a second replicated switch port associated with the backup switch card slot through a second connection replicator coupled to the second switch port and the second replicated switch port, wherein the second connection replicator is configured to ensure that data on the second switch port and the second replicated switch port are the same in both directions.

2. The method as set forth in claim 1, further comprising:

switching the first sub-stream from the first switch port to a third switch port and sending the first sub-stream through the third switch port to a third application port associated with a second application card received in a second application card slot of the packet switch, the third switch port associated with the primary switch port slot; and switching the second sub-stream from the second switch port to a fourth switch port and sending the second sub-stream through the fourth switch port to a fourth application port associated with the second application card, the fourth switch port associated with the primary switch port slot.

3. The method as set forth in claim 1, further comprising:

regenerating the data stream at the second application card based on the first and second sub-streams; and sending out the regenerated data stream from the second application card.

4. The method as set forth in claim 3, dividing the data stream into at least two sub-streams comprising adding a sequence number to each packet, and regenerating the data stream comprising ordering the packets based on the sequence numbers.

5. The method as set forth in claim 3, the data stream comprising a plurality of sets of fixed-length cells, each set of cells configured to be assembled into a variable-length packet, each sub-stream comprising a plurality of sets of cells, dividing the data stream into at least two sub-streams comprising adding a sequence number to each set of cells, and regenerating the data stream comprising ordering the sets of cells based on the sequence numbers.

6. The method as set forth in claim 5, dividing the data stream into at least two sub-streams further comprising assembling each set of cells into a packet;

adding the sequence number to each set of cells comprising adding the sequence number to the packet;

dividing the data stream further comprising disassembling each packet with the sequence number added into a set of cells; and regenerating the data stream further comprising assembling each set of cells into a packet, ordering the packets based on the sequence numbers, removing the sequence number from each packet, and disassembling each packet with the sequence number removed into a set of cells.

7. The method as set forth in claim 6, further comprising selecting in which of the sub-streams a particular set of cells is to be included based on a traffic load for the first application port and a traffic load for the second application port while the particular set of cells is being assembled into a packet, having a sequence number added, and being disassembled into a set of cells.

8. A packet switch for switching packets in a communication network, comprising:

a first application card configured to (i) divide a data stream into at least two sub-streams, (ii) send a first sub-stream through a first application port of the first application card, and (iii) send a second sub-stream through a second application port of the first application card, wherein the at least two sub-streams are load balanced, wherein the first application card further comprises a packet manipulator that divides the data stream into the at least two sub-streams, wherein the data stream is comprised of a plurality of cells that are placed into a plurality of packets by the packet manipulator;

a primary switch card slot coupled to the first application card, the primary switch card slot configured to (i) receive the first sub-stream at a first switch port of the primary switch card slot and receive the second sub-stream at a second switch port of the primary switch card slot and (ii) send the first sub-stream through a third switch port of the primary switch card slot and send the second sub-stream through a fourth switch port of the primary switch card slot;

a backup switch card slot configured to receive a replicated first sub-stream from the first switch port at a first replicated switch port of the backup switch card slot and receive a replicated second sub-stream from the second switch port at a second replicated switch port of the backup switch card slot;

a plurality of connection replicators configured to couple corresponding switch ports between the primary switch card slot and the backup switch card slot and replicate each sub-stream; and a second application card coupled to the packet switch, the second application card configured to receive the first sub-stream at a third application port of the second application card and the second sub-stream at a fourth application port of the second application card, wherein each of the plurality of connection replicators are configured to ensure that data on corresponding switch ports between the primary switch card slot and the backup switch card slot are the same in both directions.

9. The packet switch as set forth in claim 8, the data stream comprising a plurality of sets of fixed-length cells, each set of cells configured to be assembled into a variable-length packet, each sub-stream comprising a plurality of sets of cells, the packet switch further comprising:

a first inverse-multiplexing module (IMM) associated with the first application card, the first IMM configured to add a sequence number to each set of cells; and a second IMM associated with the second application card, the second IMM configured to regenerate the data stream by ordering the sets of cells based on the sequence numbers; and the second application card further configured to send out the regenerated data stream.

10. The packet switch as set forth in claim 9, the first IMM further configured to assemble each set of cells into a packet, add the sequence number to each set of cells by adding the sequence number to the packet, and disassemble each packet with the sequence number added into a set of cells.

11. The packet switch as set forth in claim 10, the second IMM configured to regenerate the data stream by assembling each set of cells into a packet, ordering the packets based on the sequence numbers, removing the sequence number from each packet, and disassembling each packet with the sequence number removed into a set of cells.

12. The packet switch as set forth in claim 8, further comprising:
a first inverse-multiplexing module (IMM) associated with the first application card, the first IMM configured to add a sequence number to each packet; and
a second IMM associated with the second application card, the second IMM configured to regenerate the data stream by ordering the packets based on the sequence numbers; and
the second application card further configured to send out the regenerated data stream.

13. The packet switch as set forth in claim 8, wherein the plurality of packets are ATM (Asynchronous Transfer Mode) packets.

14. A packet switch for switching packets in a communication network, comprising:
a first application card slot coupled to a backplane of the packet switch, the first application card slot configured to receive a first application card, the first application card comprising a first and second application ports and configured to (i) divide a data stream into at least a first and second sub-streams, (ii) send a first sub-stream through the first application port, and (iii) send a second sub-stream through the second application port;
a primary switch card slot coupled to the backplane of the packet switch, the primary switch card slot comprising a first, second, third, and fourth switch ports and configured to receive a primary switch card, the primary switch card configured to (i) receive the first sub-stream at the first switch port and send the first sub-stream through the second switch port and (ii) receive the second sub-stream at the third switch port and send the second sub-stream through the fourth switch port; and
a backup switch card slot coupled to the backplane of the packet switch, the backup switch card slot comprising a first, second, third, and fourth replicated switch ports and configured to receive a replicated first sub-stream from the first switch port at the first replicated switch port of the backup switch card slot and receive a replicated second sub-stream from the second switch port at the second replicated switch port of the backup switch card slot;
a plurality of connection replicators configured to couple corresponding switch ports between the primary switch card slot and the backup switch card slot and replicate each sub-stream; and
a second application card slot coupled to the back plane of the packet switch, the second application card slot configured to receive a second application card, the second application card comprising a third and fourth application ports and configured to receive the first sub-stream at the third application port and the second sub-stream at the fourth application port,
wherein each of the plurality of connection replicators are configured to ensure that data on corresponding switch ports between the primary switch card slot and the backup switch card slot are the same in both directions.

15. The packet switch as set forth in claim 14, wherein each connection replicator is configured to replicate a sub-stream of data received at each switch port for the first switch card slot and to send the replicated sub-stream to the corresponding backup switch port for the second switch card slot.

16. The packet switch as set forth in claim 14, wherein the second application card is further configured to synchronize the first sub-stream and the second sub-stream sent from the first application card.

17. The packet switch as set forth in claim 14, the data stream comprising a plurality of sets of fixed-length cells, each set of cells configured to be assembled into a variable-length packet, each sub-stream comprising a plurality of sets of cells, the packet switch further comprising:
a first inverse-multiplexing module (IMM) associated with the first application card, the first IMM configured to add a sequence number to each set of cells; and
a second IMM associated with the second application card, the second IMM configured to regenerate the data stream by ordering the sets of cells based on the sequence numbers; and
the second application card further configured to send out the regenerated data stream.

18. The packet switch as set forth in claim 17, the first IMM further configured to assemble each set of cells into a packet, add the sequence number to each set of cells by adding the sequence number to the packet, and disassemble each packet with the sequence number added into a set of cells.

19. The packet switch as set forth in claim 18, the second IMM configured to regenerate the data stream by assembling each set of cells into a packet, ordering the packets based on the sequence numbers, removing the sequence number from each packet, and disassembling each packet with the sequence number removed into a set of cells.

20. The packet switch as set forth in claim 18, the first IMM further configured to select in which of the sub-streams a particular set of cells is to be included based on a traffic load for the first application port and a traffic load for the second application port while the particular set of cells is being assembled into a packet, having a sequence number added, and being disassembled into a set of cells.

* * * * *